United States Patent
Patel et al.

(10) Patent No.: US 7,964,050 B2
(45) Date of Patent: Jun. 21, 2011

(54) METHOD FOR PROCESSING A COMPOSITE

(75) Inventors: Chinkal Patel, Ancaster (CA); Andrew Galbraith, St. George (CA); Ralph Douglas Cope, Elkton, MD (US); Kimberly Ann Ferrara, Middletown, DE (US); Michael James Case, Bear, DE (US)

(73) Assignee: Barrday, Inc. (CA)

( * ) Notice: Subject to any disclaimer, the term of this patent is extended or adjusted under 35 U.S.C. 154(b) by 486 days.

(21) Appl. No.: 12/132,912

(22) Filed: Jun. 4, 2008

(65) Prior Publication Data
US 2009/0301642 A1    Dec. 10, 2009

(51) Int. Cl.
*B32B 37/20* (2006.01)
*B32B 37/26* (2006.01)
*B32B 38/04* (2006.01)
*B32B 38/10* (2006.01)

(52) U.S. Cl. ......... 156/177; 156/248; 156/249; 156/289
(58) Field of Classification Search .................. 156/177, 156/178, 248, 249, 260, 265, 266, 285, 519, 156/552, 580, 583.1, 289, 344, 598
See application file for complete search history.

(56) References Cited

U.S. PATENT DOCUMENTS

| | | | |
|---|---|---|---|
| 4,403,012 A | 9/1983 | Harpell et al. | |
| 4,613,535 A | 9/1986 | Harpell et al. | |
| 4,916,000 A | 4/1990 | Li et al. | |
| 4,953,234 A | 9/1990 | Li et al. | |
| 5,061,545 A | 10/1991 | Li et al. | |
| 5,093,158 A | 3/1992 | Li et al. | |
| 5,112,667 A | 5/1992 | Li et al. | |
| 5,160,776 A | 11/1992 | Li et al. | |
| 5,173,138 A | 12/1992 | Blauch et al. | |
| 5,175,040 A | 12/1992 | Harpell et al. | |
| 5,198,301 A | 3/1993 | Hager et al. | |
| 5,229,562 A | 7/1993 | Burnett et al. | |
| 5,330,820 A | 7/1994 | Li et al. | |
| 5,354,605 A | 10/1994 | Lin et al. | |
| 5,376,426 A | 12/1994 | Harpell et al. | |
| 5,437,905 A | 8/1995 | Park | |
| 5,440,965 A | 8/1995 | Cordova et al. | |
| 5,443,882 A | 8/1995 | Park | |
| 5,443,883 A | 8/1995 | Park | |

(Continued)

FOREIGN PATENT DOCUMENTS
CA    2583233    1/2007
(Continued)

*Primary Examiner* — Philip C Tucker
*Assistant Examiner* — Sing P Chan
(74) *Attorney, Agent, or Firm* — Carlson, Gaskey & Olds PC

(57) ABSTRACT

A method for processing a composite includes consolidating a section of a continuous length of a first feedstock together with a section of a continuous length of a second feedstock to form a consolidated section. The first feedstock is made of a first composite layer that is releasably bonded to a first release layer, and the second feedstock is made of a second composite layer that is releasably bonded to a second release layer. The first release layer is then separated from the consolidated section and from a portion of the first composite layer a distance beyond an edge of the consolidated section. The first composite layer is then cut within the distance beyond the edge to release the consolidated section from the remaining continuous length of the first feedstock.

20 Claims, 3 Drawing Sheets

U.S. PATENT DOCUMENTS

| | | | |
|---|---|---|---|
| 5,480,706 A | 1/1996 | Li et al. |
| 5,547,536 A | 8/1996 | Park |
| 5,552,208 A | 9/1996 | Lin et al. |
| 5,567,498 A | 10/1996 | McCarter et al. |
| 5,578,159 A * | 11/1996 | Miyashita et al. | 156/358 |
| 5,587,230 A | 12/1996 | Lin et al. |
| 5,635,288 A | 6/1997 | Park |
| 5,661,772 A | 8/1997 | Bar et al. |
| 5,677,029 A | 10/1997 | Prevorsek et al. |
| 5,690,529 A | 11/1997 | Oberpriller et al. |
| 5,766,725 A | 6/1998 | Hogenboom et al. |
| 5,804,015 A | 9/1998 | McCarter et al. |
| 5,935,678 A | 8/1999 | Park |
| 5,952,678 A | 9/1999 | Ashida |
| 5,954,356 A | 9/1999 | Busby, Jr. et al. |
| 6,022,601 A | 2/2000 | Pfister et al. |
| 6,183,834 B1 | 2/2001 | Van Der Loo |
| 6,238,768 B1 | 5/2001 | Van de Goot |
| 6,448,359 B1 | 9/2002 | Kavesh |
| 6,642,159 B1 | 11/2003 | Bhatnagar et al. |
| 6,746,975 B2 | 6/2004 | Kavesh |
| 6,841,492 B2 | 1/2005 | Bhatnagar et al. |
| 6,846,548 B2 | 1/2005 | Harpell et al. |
| 6,846,758 B2 | 1/2005 | Bhatnagar et al. |
| 6,893,704 B1 | 5/2005 | Van Der Loo |
| 6,931,662 B2 | 8/2005 | Lindemulder |
| 7,010,811 B1 | 3/2006 | Park |
| 7,073,538 B2 | 7/2006 | Bhatnagar et al. |
| 7,114,186 B2 | 10/2006 | Steeghs et al. |
| 7,211,291 B2 | 5/2007 | Harpell et al. |
| 7,288,307 B2 | 10/2007 | Bhatnagar et al. |
| 7,288,493 B2 | 10/2007 | Bhatnagar et al. |
| 2003/0044571 A1 | 3/2003 | Mokveld |
| 2006/0002977 A1 | 1/2006 | Dugan |
| 2006/0051564 A1 | 3/2006 | Jacobs et al. |
| 2007/0003334 A1 | 1/2007 | Shinshi et al. |
| 2007/0058679 A1 | 3/2007 | Pelletier et al. |
| 2007/0080113 A1 | 4/2007 | Vuong |
| 2007/0089317 A1 | 4/2007 | Crawford et al. |
| 2007/0097780 A1 | 5/2007 | Chen et al. |
| 2007/0107539 A1 | 5/2007 | Bell et al. |
| 2007/0122011 A1 | 5/2007 | Takizawa |
| 2007/0163023 A1 | 7/2007 | Steeman et al. |
| 2007/0293109 A1 | 12/2007 | Bhatnagar |

FOREIGN PATENT DOCUMENTS

| | | |
|---|---|---|
| WO | 2006002977 | 1/2006 |
| WO | 2007003334 | 1/2007 |
| WO | 2007005043 | 1/2007 |
| WO | 2007016382 | 2/2007 |
| WO | 2007058679 | 5/2007 |
| WO | 2007067951 | 6/2007 |
| WO | 2007080113 | 7/2007 |
| WO | 2007084104 | 7/2007 |
| WO | 2007097780 | 8/2007 |
| WO | 2007122011 | 11/2007 |
| WO | 2008016362 | 2/2008 |

* cited by examiner

METHOD FOR PROCESSING A COMPOSITE

BACKGROUND OF THE INVENTION

This disclosure relates to manufacturing multi-layer composites and, more particularly, to a method of processing that preserves intact a release layer of a feedstock such that the release layer may be subsequently reused.

Multi-layer composites may be used for a wide variety of applications, including ballistic resistance. For example, a ballistic composite may include multiple fibrous layers that cooperate to provide a desired degree of ballistic resistance. The layers may be consolidated or bonded together in any of a variety of different ways. For instance, the multi-layer composite may be manufactured in a continuous or semi-continuous manner.

One conventional manufacturing process includes using continuous lengths of feedstock from two feedstock rolls. Each feedstock may include a release paper bonded to a composite layer that is to be incorporated into the final multi-layer composite. The release paper functions as a support for the composite layer during the manufacturing process, but is not part of the final multi-layer composite.

Typically, sections of at least one of the composite layers are cut free from its feedstock roll for consolidation with the other feedstock. The release paper may be cut or damaged when cutting the composite layer. The release paper may not be suitable for reuse if it is cut or damaged. Alternatively, a heat knife may be used to melt and separate the composite layer from its feedstock roll while the release paper is attached, without melting the release paper. However, using the heat knife undesirably limits the types of materials that may be used for the composite layer because if higher temperatures are required to melt the composite layer, the release layer may be damaged. Therefore, the disclosed processing method that preserves the release paper for reuse without damaging the release paper is needed.

SUMMARY OF THE INVENTION

In one example, a method for processing a composite includes consolidating a section of a continuous length of a first feedstock together with a section of a continuous length of a second feedstock to form a consolidated section. The first feedstock is made of a first composite layer that is releasably bonded to a first release layer, and the second feedstock is made of a second composite layer that is releasably bonded to a second release layer. The first release layer is then separated from the consolidated section and from a portion of the first composite layer a distance beyond an edge of the consolidated section. The first composite layer is then cut within the distance beyond the edge to release the consolidated section from the remaining continuous length of the first feedstock. Thus, the first release layer remains intact and can be collected for reuse.

In another aspect, a method for processing a composite includes consolidating successive sections of a continuous length of a first oriented fiber composite feedstock together with successive sections of a continuous length of a second oriented fiber composite feedstock to form cross-plied consolidated sections. The first feedstock is made of a first oriented fiber layer that is releasably bonded to a release layer, and the second feedstock is made of a second oriented fiber layer that is releasably bonded to a second release layer. The second oriented fiber layer is nominally oriented at an angle that is greater than 0° and less than or equal to 90° relative to the first oriented fiber layer. The first release layer is then separated from the cross-plied consolidated section and from a portion of the first oriented fiber layer a distance beyond an edge of the cross-plied consolidated section. The first oriented fiber layer is then cut within the distance beyond the edge to release the cross-plied consolidated section from a remaining continuous length of the first oriented fiber composite feedstock.

In another aspect, a method for processing a composite includes moving a section of a continuous length of a first feedstock into a consolidation zone and moving a section of a continuous length of a second feedstock into the consolidation zone. The first feedstock is made of a first composite layer that is releasably bonded to a first release layer, and the second feedstock is made of a second composite layer that is releasably bonded to a second release layer. A clamp is then positioned between the first composite layer and the first release layer at a free end of the section of the continuous length of the first feedstock. The clamp clamps the first composite layer to the section of the continuous length of the second feedstock. The section of the continuous length of the first feedstock is then consolidated together with the section of the continuous length of the second feedstock to form a consolidated section. The consolidated section is then held in place using the clamp while separating the first release layer from the consolidated section.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
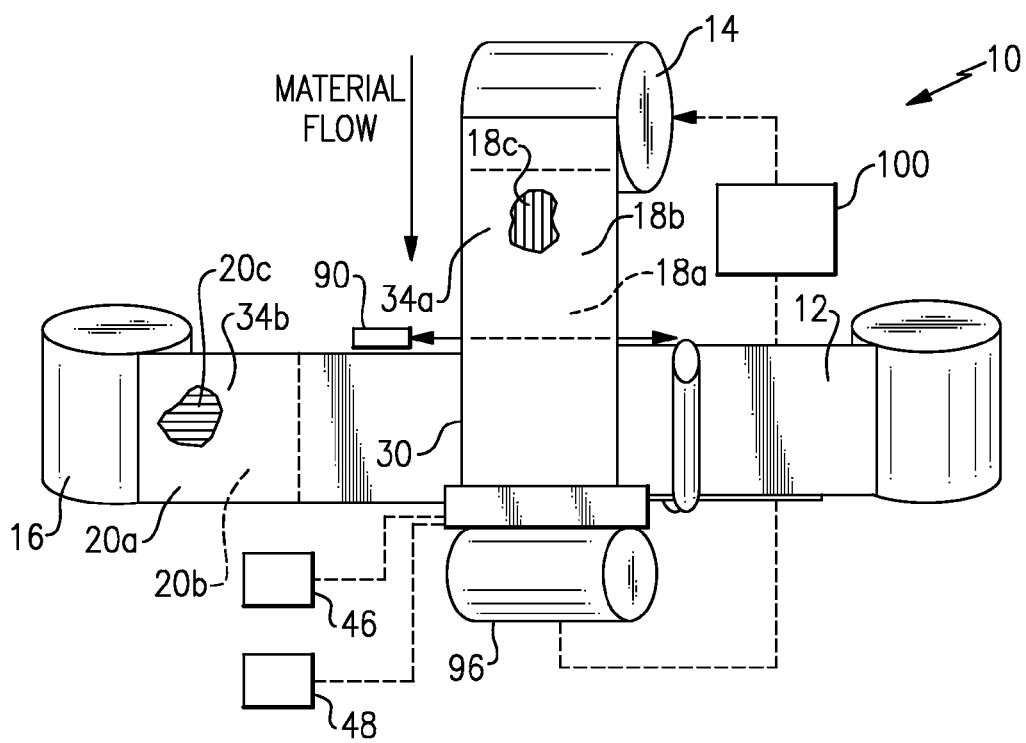
FIG. 1 illustrates an example arrangement for processing a composite.

FIG. 1 schematically illustrates an example arrangement 10 for processing a composite 12 from a first feedstock 14 and a second feedstock 16. As can be appreciated, the arrangement 10 is only an example and may be adapted to the particular needs of an application. The first feedstock 14 and the second feedstock 16 may be provided as feed rolls or other continuous sources of the first feedstock 14 and the second feedstock 16.

The first feedstock 14 includes a continuous length of a composite layer 18a releasably bonded to a release layer 18b, and the second feedstock 16 includes a continuous length of a composite layer 20a releasably bonded to a release layer 20b. The composite layers 18a and 20a may be any type of material that is desirable for forming the composite 12 and are not limited to any particular material.

In some examples, the composite layers 18a and 20a may include a monolithic polymer material, reinforced polymer material, fibrous material, oriented fiber layer, woven fabric, non-woven adhesive web, oriented film, film cast on release lining, quasi-unidirectional ballistic fabric as described in U.S. Pat. No. 6,861,378 or any other type of material or layer that is desired for incorporation into the composite 12. If fibers are used, the fibers may be any type of material that is desired for use in the final composite 12. Additionally, the first feedstock 14, the second feedstock 16, or both, may include additional composite layers as described in this disclosure. Thus, the processing disclosed herein is not limited to any particular type of composite layer or structure of feedstock material.

In the illustrated example, the composite layers 18a and 20a include respective unidirectionally oriented fibers 18c and 20c shown in the cutaway sections of the composite layers 18a and 20a. Both feedstock materials consist of unidirectional oriented in 0 degree direction. The unidirectionally oriented fibers 18c of the composite layer 18a are nominally oriented at an angle that is greater than 0° and less than or equal to 90° relative to the unidirectionally oriented fibers 20c of the composite layer 20a. For example, the unidirectionally oriented fibers 18c are oriented 90° relative to the unidirectionally oriented fibers 20c.

The unidirectionally oriented fibers 18c and 20c may be any types of fibers that are desired for use in the final composite 12. In one example, the fibers 18c and 20c are aramid fibers, such as KEVLAR®, TWARON®, Technora®, or HERACRON®. In another example, the fiber 18c and 20c are ballistic resistant yarns having tenacity of at least about 15 grams per denier and a tensile modulus of at least about 400 grams per denier. A few example ballistic resistant yarns include polypropylene (e.g., Innegra™), extended chain polyethylene fibers (e.g., Spectra®, Dyneema®, Tensylon®, or Tekmilon®) poly(p-phenylene-2,6-benzobisoxazole) (PBO) fibers (e.g., Zylon®), glass fibers, and fibers formed of liquid crystal polymer (e.g., Vectran®). Further, the unidirectionally oriented fibers 18c and 20c may have any denier desired for achieving desired properties of the final composite 12.

The unidirectionally oriented fibers 18c and 20c may be dispersed within a matrix of a desired type of polymer. In one example, the polymer is an elastomer. In a further example, the polymer includes isoprene, such as KRATON®, PRINLIN®, or a mixture thereof. In other examples, the polymer may be styrene-butadiene, polyisoprene, polyisobutylene, polybutadiene, stryrene-butadiene-styrene, styrene-isoprene-styrene, poly-vinyl butadiene, styrene isoprene butadiene, ethylene-acrylic acid, ethylene ethyl acrylate, ethylene methyl acrylate, acrylonitrile-ethylene/propylene-styrene, acrylonitrile butadiene styrene, acrylonitrile butadiene acrylate, polycholoprene, polyurethane, polyethylene, natural rubber, or an alkyd. The may alternatively be a thermoset resin, such as epoxy, acrylic, urethane, vinyl ester, or phenolic. It is to be understood that any of the polymers listed above may also include additional additives for providing desired processing and physical properties. For example, the additives may include rheology modifying agents, antioxidants, fillers, cross linking agents, thickeners, tackifiers, etc. Given this description, one of ordinary skill in the art will recognize other types of fibers, matrices, and composite layers that would benefit from this disclosure.

Optionally, the unidirectionally oriented fibers 18c and 20c may be coated with water or solvent based solutions to facilitate processing or promote adhesion. For instance, the solvent may be a ketone, alcohol, alkane, ester, or other. In further examples, the solvent may be acetone, methyl propyl ketone, isopropyl alcohol, butyl alcohol, isopropyl acetate, glycol ether, methyl ethyl ketone, lacolene, styrene, or toluene.

FIGS. 2-8 illustrate various example processing steps for forming the final composite 12 and additional portions of the arrangement 10. The first feedstock 14 and the second feedstock 16 are fed (e.g., using conveyors) into a consolidation zone 30 between a hot platen 32a and a cold platen 32b. As will be discussed below, the hot platen 32a and the cold platen 32b compress successive sections 34a of the first feedstock 14 with successive sections 34b of the second feedstock 16 to form the composite 12.

The apparatus 10 includes a cooling head 40 that is movable between the hot platen 32a and the cold platen 32b. For example, the cooling head 40 may be moved using a robotic machine. A bracket 44 attaches a separating device 42 to the cooling head 40, although the separating device 42 may be attached in any suitable manner.

The separating device 42 may be any type of device that facilitates separating the release layer 18b. In one example, the separating device is a roller or non-rotating member having a curved surface that is vertically offset from the bottom surface of the cooling head 40 to facilitate separating the release layer 18b, as will be described below. In the disclosed example, the release layer 18b runs below the cooling head 40 and over the roller of the separating device 42.

The cooling head 40 is operatively connected with a vacuum source 46 and a cooling source 48. The vacuum source 46 may be selectively controlled in a known manner to evacuate the cooling head 40 and thereby facilitate handling of the sections 34a of the first feedstock 14. The cooling source 48 may circulate a coolant through the cooling head 40 to maintain the cooling head 40 at a desired temperature. For example, the desired temperature may be less than the temperature of the hot platen 32a.

A clamp 50 may be pivotally mounted near one end of the cool platen 32b. The clamp 50 may be automated in a known manner and controlled in cooperation with control of the apparatus 10 to facilitate consolidation of the sections 34a and 34b as discussed below.

Figure 2:
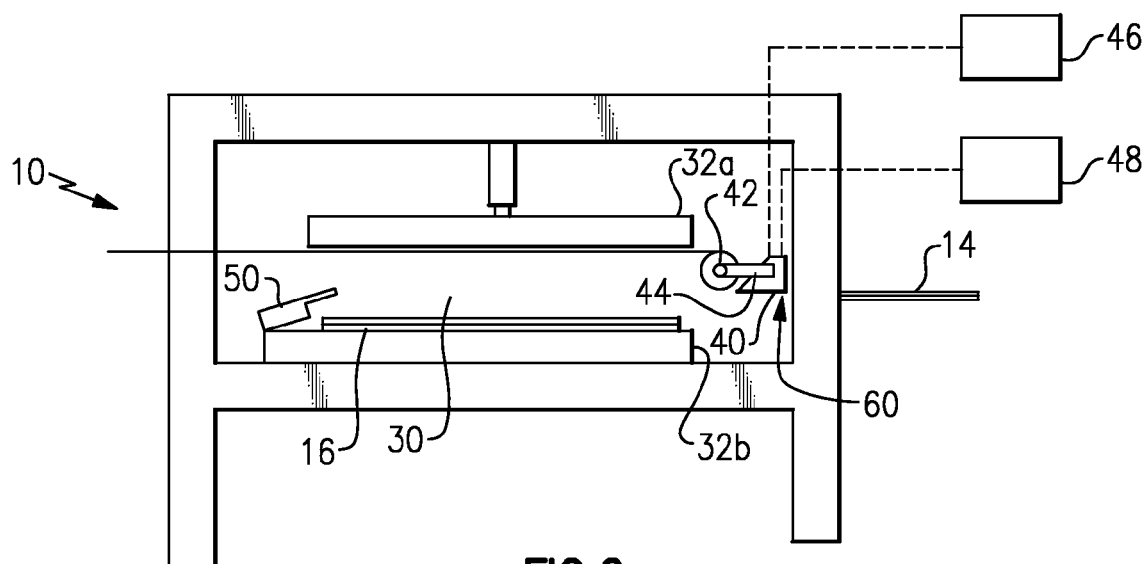
FIG. 2 illustrates an example processing step and additional portions of the arrangement.
Figure 3:
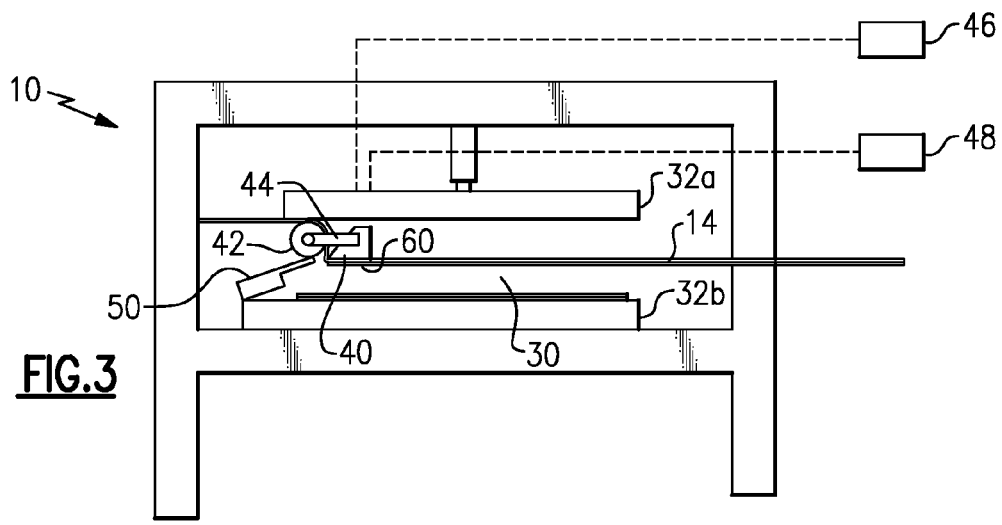
FIGS. 3-8 illustrates additional example processing steps.

In operation, the apparatus 10 successively feeds the sections 34a of the first feedstock 14 and sections 34b of the second feedstock 16 into the consolidation zone 30. Referring to FIG. 2, the cooling head 40 carries each successive section 34a of the first feedstock 14 into the consolidation zone 30. For example, the vacuum source 46 evacuates the cooling head 40 such that the cooling head 40 suctions onto a free end 60 of the first feedstock 14. The cooling head 40 then translates with the free end 60 between the hot platen 32a and the cool platen 32b to the position illustrated in FIG. 3. Thus, a first one of the sections 34a is positioned over the section 34b of the second feedstock 16 in the consolidation zone 30.

Figure 4:
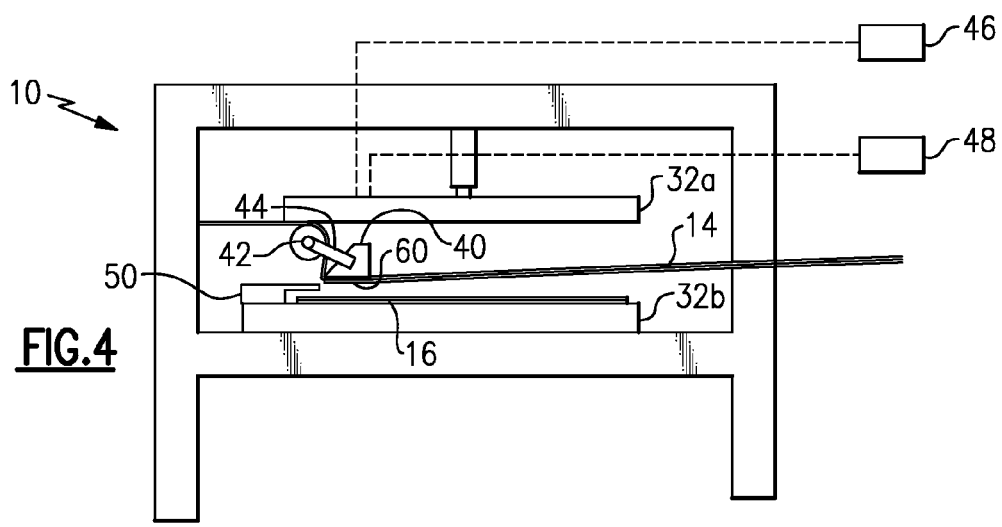

As illustrated in FIG. 4, the cooling head 40 lowers toward the cool platen 32b. While lowering, the separating device 42 actuates a clamp 50 that wedges between the composite layer 18a and the release layer 18b (see FIG. 5). The clamp 50 then tightens down on the composite layer 18a, thereby clamping the composite layer 18a to the second feedstock 16 and to the cool platen 32b.

Figure 5:
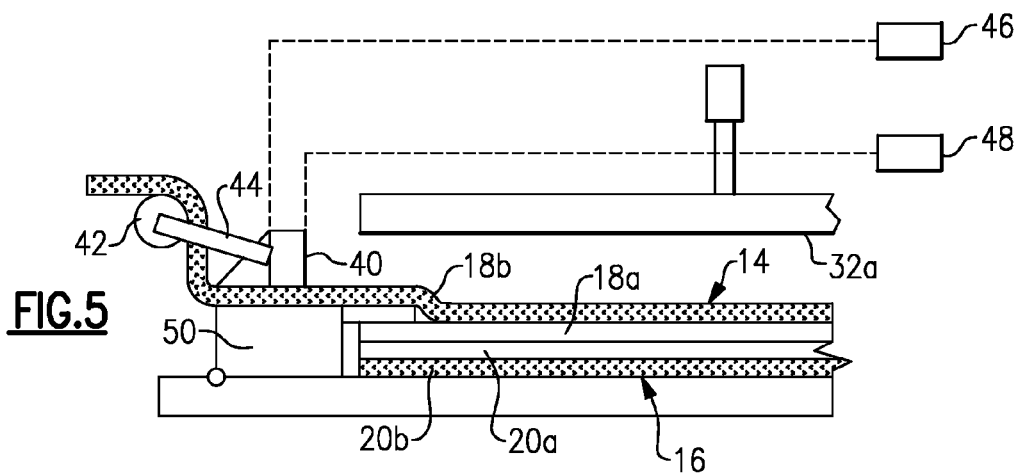
Figure 6:
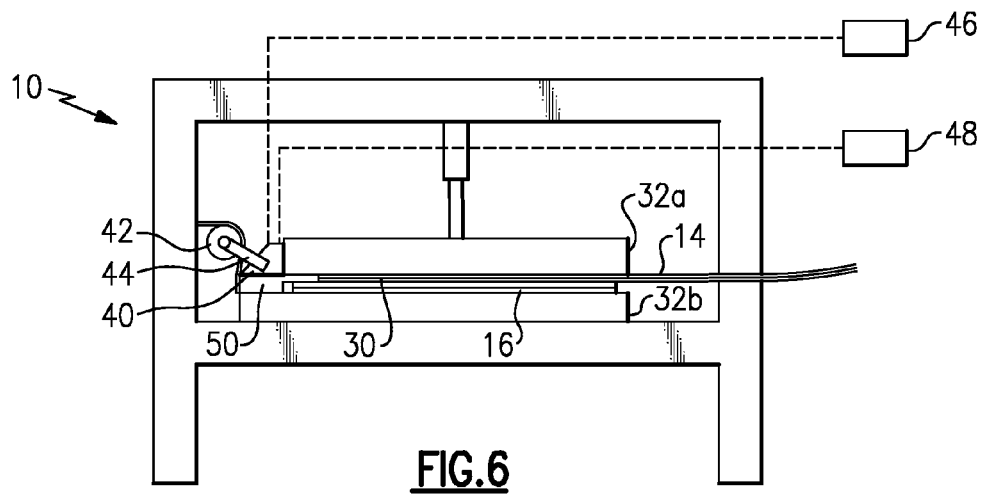
Figure 7:
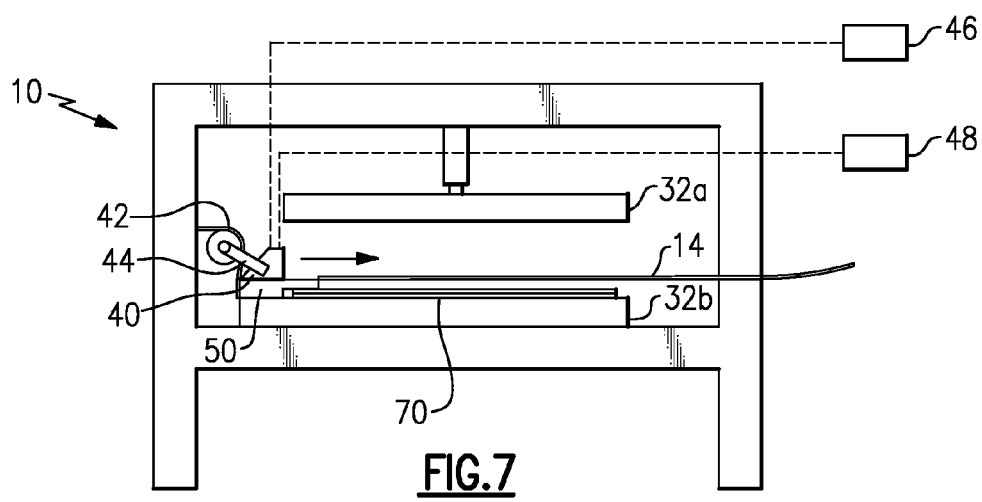

As illustrated in the closer view of FIG. 5, the cooling head 40 then moves clear from between the hot platen 32a and the cool platen 32b. As illustrated in FIG. 6, the hot platen 32b then lowers toward the cool platen 32b to consolidate the composite layer 18a with the composite layer 18b. For example, the hot platen 32a and the cool platen 32b exert a predetermined pressure on the composite layers 18a and 18b under the predetermined temperature of the hot platen 32a to bond the composite layer 18a and the composite layer 18b together to form a consolidated section 70. After a predetermined amount of time, the hot platen 32a is released and raised as in FIG. 7.

The cooling head 40 then translates across the top surface of the consolidated section 70 to thereby cool the consolidated section 70. In one example, the coolant from the cooling source 48 circulates through the cooling head 40 to cool the consolidated section 70 to a desired temperature. The cooling head 40 may be translated at any desired velocity. For example, a relatively slower velocity may provide a greater cooling effect, and a relatively faster velocity may provide a lesser cooling effect.

As the cooling head 40 translates, the separating device 42 peels the release layer 18*b* from the consolidated section 70. For instance, if a vertically offset roller is used as the separating device 42 as in the illustrated example, the offset position of the roller produces an upward force on the release layer 18*b* as the cooling head 40 translates. The upward force peels the release layer 18*b* away from the consolidated section 70. Thus, the cooling head 40 provides the dual function of cooling the consolidated section 70 and facilitating separating the release layer 18*b*. The cooling head can also apply desired pressure levels to facilitate cooling under pressure if required. In an example where high consolidation temperatures are required it is desirable to cool under pressure to prevent yarn buckling or formation of crimp on consolidated unidirectional layers. Cooling under pressure allows yarns to resume to their original feedstock state in the case of high consolidation temperatures are used. The cooling and vacuum head can take the required physical configuration to achieve desired pressures.

Figure 8:
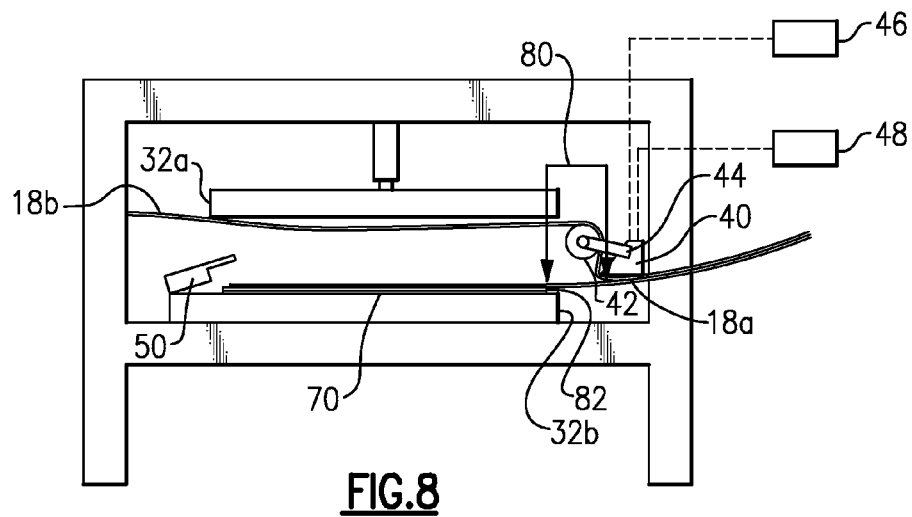

As illustrated in FIG. 8, the cooling head 40 translates to a location that is a distance 80 beyond the right edge 82 of the consolidated section 70. Thus, there is a section 84 of the composite layer 18*a* between the consolidated section 70 and the remaining portion of the first feedstock 14 that does not have any attached release layer 18*b*. A cutting device 90 (FIG. 1) may then be used to cut the composite layer 18*a* at the section 84.

The cutting device 90 may any type of suitable device for severing the composite layer 18*a*. For instance, the cutting device 90 may be a blade that translates and cuts along the width of the section 84 of the composite layer 18*a* to release the consolidated section 70 from the remaining portion of the first feedstock 14. Cutting the composite layer 18*a* at the section 84 provides the benefit of preserving intact the release layer 18*b* for subsequent reuse. For instance, the release layer 18*b* may be collected on a roll 96 and eventually reused. In some examples, the release layer 18*b* may be fed into another process 100 that deposits another composite layer or oriented fiber composite layer on the release layer 18*b*, which may then be used as the first feedstock 14. As can be appreciated, reusing the release layer 18*b* may be a continuous or discontinuous process.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method for processing a composite, comprising:
consolidating a section of a continuous length of a first feedstock together with a section of a continuous length of a second feedstock to form a consolidated section, the first feedstock being comprised of a first composite layer releasably bonded to a first release layer and the second feedstock being comprised of a second composite layer releasably bonded to a second release layer;
separating the first release layer from the consolidated section and from a portion of the first composite layer a distance beyond an edge of the consolidated section; and
cutting the portion of the first composite layer within the distance beyond the edge to release the consolidated section from the remaining continuous length of the first feedstock.

2. The method as recited in claim 1, further comprising consolidating the section of the continuous length of the first feedstock together with the section of the continuous length of the second feedstock between a hot platen and a cool platen relative to the hot platen.

3. The method as recited in claim 1, wherein the cutting of the portion of the first composite layer comprises translating a blade along a width of the first composite layer.

4. The method as recited in claim 1, wherein the first composite layer and the second composite layer each comprise at least one oriented unidirectional fibrous layer.

5. The method as recited in claim 1, further comprising collecting the first release layer in a continuous length after separation from the consolidated section.

6. The method as recited in claim 5, further comprising depositing another composite layer on the first release layer to produce another continuous length of first feedstock.

7. The method as recited in claim 1, further comprising cutting the portion of the first composite layer with a blade.

8. The method as recited in claim 1, further comprising cooling the consolidated section under pressure.

9. The method as recited in claim 1, further comprising using a cooling head to cool the consolidated section and to separate the first release layer from a portion of the first composite layer after the consolidation.

10. A method for processing a composite, comprising:
consolidating a section of a continuous length of a first feedstock together with a section of a continuous length of a second feedstock to form a consolidated section, the first feedstock being comprised of a first composite layer releasably bonded to a first release layer and the second feedstock being comprised of a second composite layer releasably bonded to a second release layer;
separating the first release layer from the consolidated section and from a portion of the first composite layer a distance beyond an edge of the consolidated section;
cutting the portion of the first composite layer within the distance beyond the edge to release the consolidated section from the remaining continuous length of the first feedstock; and
clamping the first composite layer to the section of the continuous length of the second feedstock before the consolidating.

11. The method as recited in claim 10, further comprising clamping the consolidated section in place relative to a platen while separating the first release layer from the consolidated section.

12. A method for processing a composite, comprising:
consolidating a section of a continuous length of a first feedstock together with a section of a continuous length of a second feedstock to form a consolidated section, the first feedstock being comprised of a first composite layer releasably bonded to a first release layer and the second feedstock being comprised of a second composite layer releasably bonded to a second release layer;

separating the first release layer from the consolidated section and from a portion of the first composite layer a distance beyond an edge of the consolidated section;

cutting the portion of the first composite layer within the distance beyond the edge to release the consolidated section from the remaining continuous length of the first feedstock; and translating a cooling head across the consolidated section to cool the consolidated section.

13. The method as recited in claim 12, further comprising separating the first release layer from the consolidated section at a trailing end of the cooling head as the cooling head translates using a separating device attached to the cooling head.

14. A method for processing a composite, comprising:

consolidating successive sections of a continuous length of a first oriented fiber composite feedstock together with successive sections of a continuous length of a second oriented fiber composite feedstock to form cross-plied consolidated sections, the first feedstock being comprised of a first oriented fiber layer releasably bonded to a first release layer and the second feedstock being comprised of a second oriented fiber layer releasably bonded to a second release layer, the first oriented fiber layer being nominally oriented at an angle that is greater than 0° and less than or equal to 90° relative to the second oriented fiber layer;

separating the first release layer from the cross-plied consolidated section and from a portion of the first oriented fiber layer a distance beyond an edge of the cross-plied consolidated section; and cutting the portion of the first oriented fiber layer within the distance beyond the edge to release the cross-plied consolidated section from the remaining continuous length of the first oriented fiber composite feedstock.

15. The method as recited in claim 14, further comprising collecting the first release layer in a continuous length after separation from the cross-plied consolidated sections.

16. The method as recited in claim 15, further comprising depositing another oriented fiber layer on the first release layer to produce another continuous length of oriented fiber feedstock.

17. A method for processing a composite, comprising:

moving a section of a continuous length of a first feedstock into a consolidation zone, the first feedstock being comprised of a first composite layer releasably bonded to a first release layer;

moving a section of a continuous length of a second feedstock into the consolidation zone, the second feedstock being comprised of a second composite layer releasably bonded to a second release layer;

positioning a clamp between the first composite layer and the first release layer at a free end of the section of the continuous length of the first feedstock;

clamping the first composite layer to the section of the continuous length of the second feedstock using the clamp;

consolidating the section of the continuous length of the first feedstock together with the section of the continuous length of the second feedstock to form a consolidated section; and holding the consolidated section in place using the clamp while separating the first release layer from the consolidated section.

18. The method as recited in claim 17, further comprising clamping the consolidated section in place relative to a platen used to consolidate the section of the continuous length of the first feedstock together with the section of the continuous length of the second feedstock.

19. The method as recited in claim 17, further comprising consolidating the section of the continuous length of the first feedstock together with the section of the continuous length of the second feedstock between a hot platen and a cool platen relative to the hot platen.

20. The method as recited in claim 19, further comprising clamping the consolidated section in place relative to the cool platen.

* * * * *